US007992289B2

(12) United States Patent
Cloer

(10) Patent No.: US 7,992,289 B2
(45) Date of Patent: Aug. 9, 2011

(54) PRESS-FIT CONNECTOR REMOVAL TOOL

(75) Inventor: Jimmy Kevin Cloer, Garland, TX (US)

(73) Assignee: Fujitsu Limited, Kawasaki (JP)

( * ) Notice: Subject to any disclaimer, the term of this patent is extended or adjusted under 35 U.S.C. 154(b) by 1036 days.

(21) Appl. No.: 11/834,942

(22) Filed: Aug. 7, 2007

(65) Prior Publication Data

US 2009/0038148 A1 Feb. 12, 2009

(51) Int. Cl.
*B23P 19/00* (2006.01)

(52) U.S. Cl. ....................................... 29/762; 29/426.05

(58) Field of Classification Search .................... 29/739, 29/747, 758, 762, 764, 426.1, 426.5
See application file for complete search history.

(56) References Cited

U.S. PATENT DOCUMENTS

| | | | | |
|---|---|---|---|---|
| 4,028,790 A * | 6/1977 | Dupuis | ........................... | 29/764 |
| 4,089,104 A * | 5/1978 | Barry et al. | ...................... | 29/739 |
| 4,392,301 A * | 7/1983 | Hannes et al. | .................. | 29/758 |

OTHER PUBLICATIONS

Brochure, Instruction for All Feed-To Contact Removal Tool (7 Rows) (Z-Pack HM) Male, AMP, AMP-Holland B.V., Instruction Sheet 411-19301, EH-0052-94 Rev. 0, 2 pages, Released Feb. 2004.

Brochure, Signal Pin Contact Repair Kits 354687-1, -2, and -3 for the Z-Pack* Connector, Tyco/Electronics, AMP, Instruction Sheet 408-9979, Rev. C., 2 pages, Feb. 10, 2003.

Brochure, Instruction for Single Feed-To and -Thru Contact Removal Tool (5 Rows) (Z-Pack HM) Male, AMP, AMP-Holland B.V., Instruction Sheet 411-19296, EH-0052-94 Rev. 0, 2 pages, Released Feb. 2004.

Brochure, Instruction for All Feed-Thru Contact Removal Tool (7 Rows) (Z-Pack HM) Male, AMP, AMP-Holland B.V., Instruction Sheet 411-19297, EH-0052-94 Rev. 0, 2 pages, Released Feb. 2004.

Brochure, Instruction for All Feed-Thru Contact Removal Tool (5 Rows) (Z-Pack HM) Midplane Male, AMP, AMP-Holland B.V., Instruction Sheet 411-19300, EH-0052-94 Rev. 0, 2 pages, Released Feb. 2004.

* cited by examiner

*Primary Examiner* — Donghai D. Nguyen
(74) *Attorney, Agent, or Firm* — Baker Botts L.L.P.

(57) ABSTRACT

A system for removing connector pins from a backplane comprises at least two clamp plates and a plurality of pin plates coupled between the clamp plates, the pin plates configured to be positioned between adjacent rows of the connector pins. The system further comprises a tightening mechanism to tighten the clamp plates and the pin plates around the connector pins. In some embodiments, the system comprises a frame assembly configured to be positioned over the clamp plates, and configured to pull the clamp plates, the pin plates, and the connector pins off of the circuit board.

10 Claims, 4 Drawing Sheets

PRESS-FIT CONNECTOR REMOVAL TOOL

TECHNICAL FIELD

This invention relates in general to repair equipment for electronics, and more particularly to removal of press-fit connector pins from circuit boards.

OVERVIEW

During normal assembly processing of circuit boards using connectors for telecommunications and other electronic equipment, occasional repairs must be made. Sometimes the repair requires removal of the press-fit Z-pack or similar connectors. Press-fit connectors have a plurality of contact elements pressed into contact holes in a printed circuit board, and usually employ a plastic housing. Connector pins are usually closely spaced in rows arranged in a matrix. In the past, each connector pin has been removed manually, one at a time. This process is generally slow and labor intensive, and can also lead to stress injuries for workers who have to remove a large number of connector pins.

Available off-the-shelf tooling is inadequate to remove large numbers of connector pins safely and effectively. Simple hand tools, like pliers, can also be used to remove connector pins, but these are also inadequate for many situations.

SUMMARY OF EXAMPLE EMBODIMENTS

In accordance with one embodiment of the present disclosure, a system for removing connector pins from a circuit board comprises at least two clamp plates and a plurality of pin plates coupled between the clamp plates, the pin plates configured to be positioned between adjacent rows of the connector pins. The system further comprises a tightening mechanism to tighten the clamp plates and the pin plates around the connector pins.

In accordance with another embodiment of the present disclosure, a frame assembly can be configured to be positioned over the clamp plates, and configured to pull the clamp plates, the pin plates, and the connector pins off of the circuit board.

In yet another embodiment, the system further comprises an attachment block coupled between the clamp plates, wherein the connector block comprises a connector interface configured to receive a connector of the frame assembly, such that the connector block may be pulled up from the circuit board by the frame assembly.

Technical advantages of certain embodiments of the present disclosure include the ability to reduce the manual labor involved in removing connector pins, which in turn reduces cost and time during the manufacturing process. Also, the design can be modified to remove a variety of types and arrangements of connector pins.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Press-fit connectors are well-known and widely used in the electronics manufacturing industry. Press-fit connectors have a plurality of contact elements (pins) pressed into contact holes in a printed circuit board. The pins create connections between the printed circuit board and whatever components are plugged into the top side of the press-fit connector. Press-fit contacts rely on a tight-fitting mechanical mating engagement with plated holes on a circuit board in order to establish electrical contact. During normal assembly processing, repairs must sometimes be made to the circuit board or to the press-fit connector. This can require the removal of the press-fit connector, which can be difficult to do without damaging the circuit board.

Figure 1:
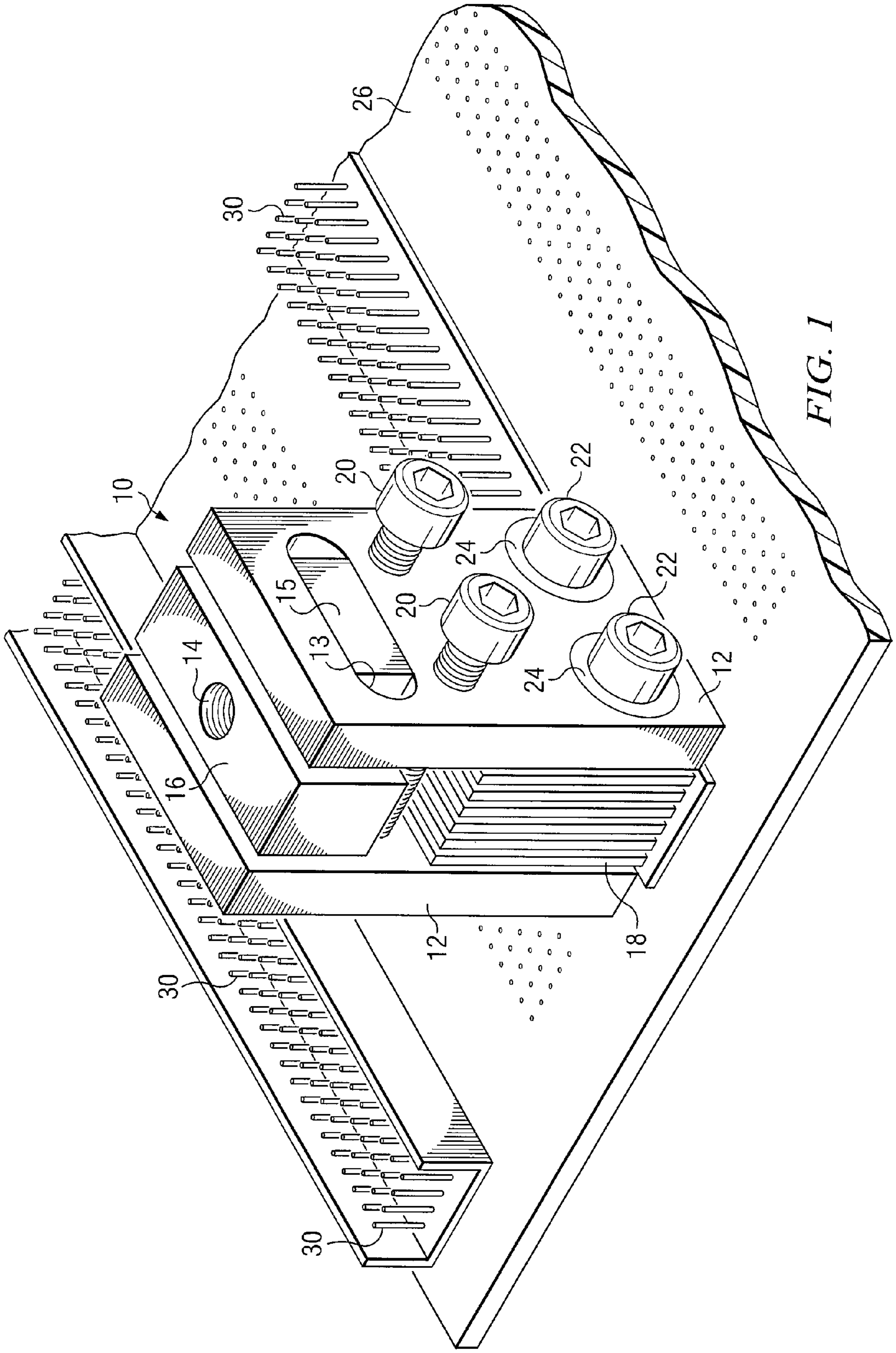
FIG. 1 illustrates one embodiment of a connector pin removal tool.

FIG. 1 illustrates one embodiment of a connector pin removal tool 10. Connector pins 30 can be seen protruding from backplane 26. The connector pin removal tool can also be used with any other type of circuit board that uses connector pins. Removal tool 10 sits on backplane 26, and uses a plurality of pin plates 18 that can be pressed together to grasp the connector pins 30 for removal. Clamp plates 12 can be placed around the pin plates 18 and used to help tighten the pin plates 18 around the connector pins 30. An attachment part, such as attachment block 16, can be included to help facilitate removal of the removal tool 10 from the backplane. This attachment can have any configuration suitable for this purpose and can have any type of connector interface 14 for coupling the connector to a device to facilitate removal of removal tool 10. Functionally, the removal tool 10 provides an arrangement that allows the pin plates 18 to be pressed together so that they clamp the connector pins 30 for removal. Socket cap screws 22 operate to loosely hold the pin plates 18 in position between the clamp plates 12. One or more tightening bolts 20 can be used to clamp the pin plates 18 and the clamp plates 12 so that they grasp the connector pins 30 for removal.

The pin plates 18 comprise a plurality of plates configured to grasp the connector pins 30, preferably made of a hard material, such as metal. The number of pin plates 18 can vary, but it is preferable to have a number sufficient to at least grasp, when used in conjunction with the clamp plates, both sides of each connector pin 30 being removed. The size of the pin plates 18 can also vary, but it is usually preferable to manufacture them small enough to fit between the rows of connector pins 30, yet large enough to grasp the connector pins 30 when force is applied to the sides of the pin plates 18. In this embodiment, pin plates 18 have two holes in them allowing socket cap screws 22 to pass through them and hold the pin plates 18 in parallel with one another. The pin plates 18 can also be manufactured with horizontal grooves in them, allowing them to more easily grip the connector pins 30 being removed. The grooves help prevent the connector pins 30 from slipping out when the pin plates 18 are pulled away from the backplane 26; the grooves also act to reduce the clamping force required to adequately grip the connector pins 30 for removal.

In this example embodiment, one clamp plate 12 is placed on each side of the pin plates 18. A shim 28 or other spacer element could be placed between the clamp plates 12 and the pin plates 18, or between each pin plate 18 if desired (see FIG. 2). Clamp plates 12 can also be comprised of a hard, durable material, such as metal. Clamp plates 12 in FIG. 1 have four holes in them. The bottom two holes allow socket cap screws 22 to hold the pin plates 18 and the clamp plates 12 in place over the connector pins 30 being removed. One of the clamp plates 12 also has one or more threaded holes operable to be used with tightening bolts 20, or any other threaded component. Tightening bolts 20 provide the tightening means for the removal tool 10. When the removal tool 10 is in place over the connector pins 30 to be removed, and the pin plates 18 have been placed around the connector pins 30, the tightening bolts 20 are turned. This movement extends the tightening bolt 20 through one of the clamp plates 12, and the end of the tightening bolt 20 pushes against the other clamp plate 12. This force at the top of the clamp plates 12 creates a tightening force at the bottom of the pin plates 18 that compresses the pin plates 18 around the connector pins 30. Once the tightening bolts 20 have been tightened to where the connector pins 30 are sufficiently grasped by the pin plates 18, the removal tool can be pulled away from the backplane 26 to remove the connector pins 30.

An attachment part, like attachment block 16, can sit between clamp plates 12 and restrict their movement during operation. In this embodiment, the attachment block 16 contains two tabs 15 that allow it to rest within the horizontal slots 13 shown in each of the clamp plates 12. The attachment block 16 allows the clamp plates 12 and pin plates 18 to be loose enough so that the pin plates 18 can be inserted between the rows of connector pins 30. The attachment block 16 also, however, allows the clamp plates 12 to be pushed apart by the tightening bolt 20, and allows the pin plates 18 to be pushed together so that they clamp the connector pins 30. Attachment block 16 can also comprise an interface for connection to a frame assembly, which can be used for pulling the removal tool 10 away from the backplane 26. In FIG. 1, attachment block 16 contains a threaded hole 14 that can be used in conjunction with a threaded bolt to pull the removal tool 10 away from the backplane 26, using a frame assembly 50 as described in FIG. 3 below.

Figure 2:
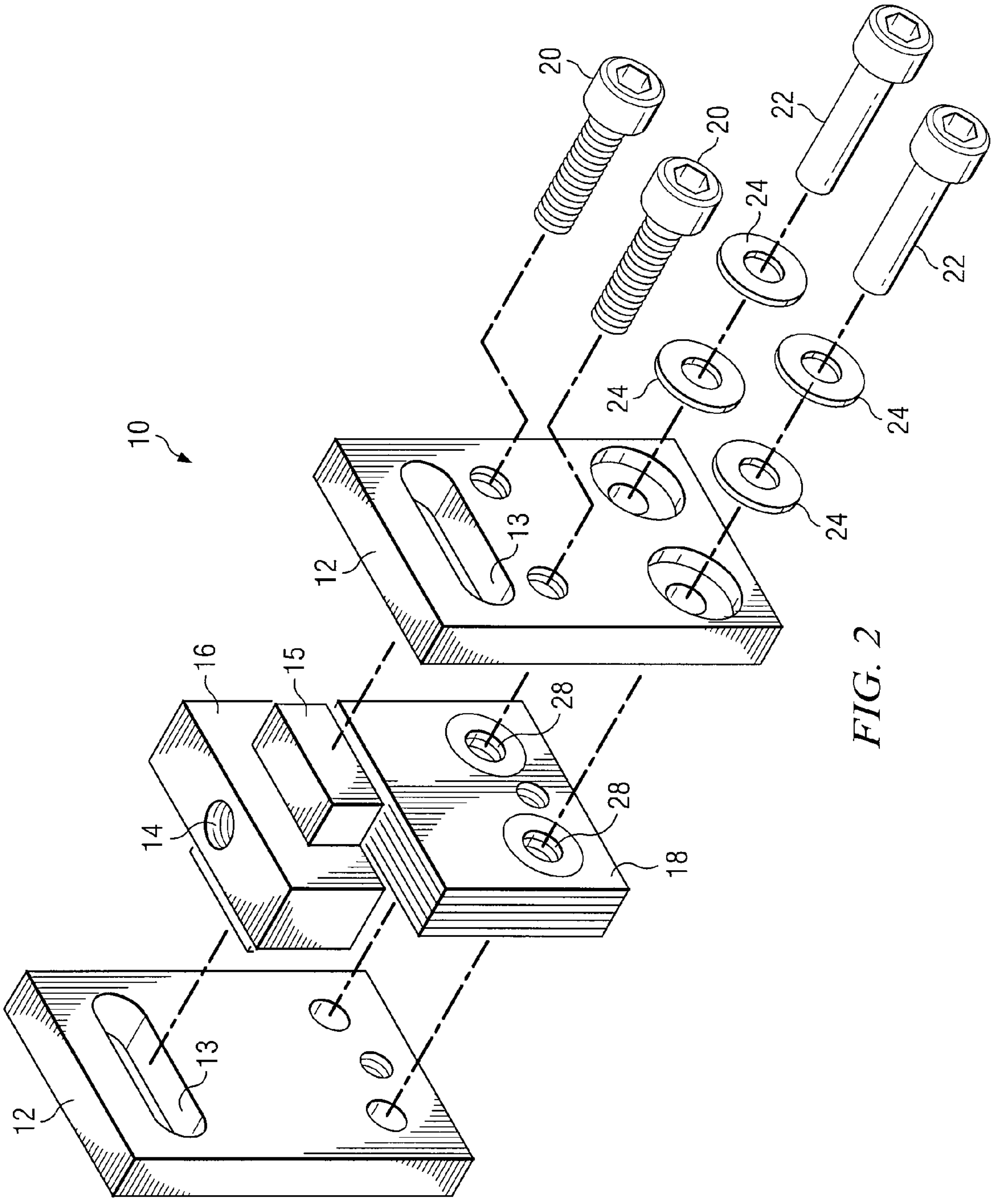
FIG. 2 is an exploded view showing the parts of one embodiment of a connector pin removal tool.

FIG. 2 is an exploded view showing the parts of one embodiment of a connector pin removal tool 10. In this view, the individual pieces of the clamp assembly can be seen. Slots 15 on attachment block 16 can be seen more clearly here. Socket cap screws 22 extend through both clamp plates 12 and through pin plates 18, and can be used in conjunction with spherical or other suitable washers 24. It can also be seen that tightening bolts 20 extend in this embodiment underneath attachment block 16, and through one clamp plate 12. In this figure, shims 28 can also be seen on pin plates 18. These can serve as spacers for the pin plates 18.

Once the tightening bolts 20 have been tightened such that the bottom of clamp plates 12 and pin plates 18 firmly hold the connector pins 30, an upward force can be applied to remove the removal tool 10, and thus the connector pins 30, from the backplane 26. In some embodiments, pieces of the connector besides the connector pins 30 are also removed from the backplane, such as a plastic housing around the pins. The upward force can be achieved in a variety of ways. One method is to pull the removal tool 10 upward by hand, which pulls the connector pins 30 from the backplane 26 in the process. However, removing the removal tool 10 by hand can be difficult in some situations. For example, it may require more force than the operator is capable of providing, or it may cause repetitive stress injuries if a large number of connector pins 30 needs to be removed. It can also be more likely to cause damage to the backplane 26.

Figure 3:
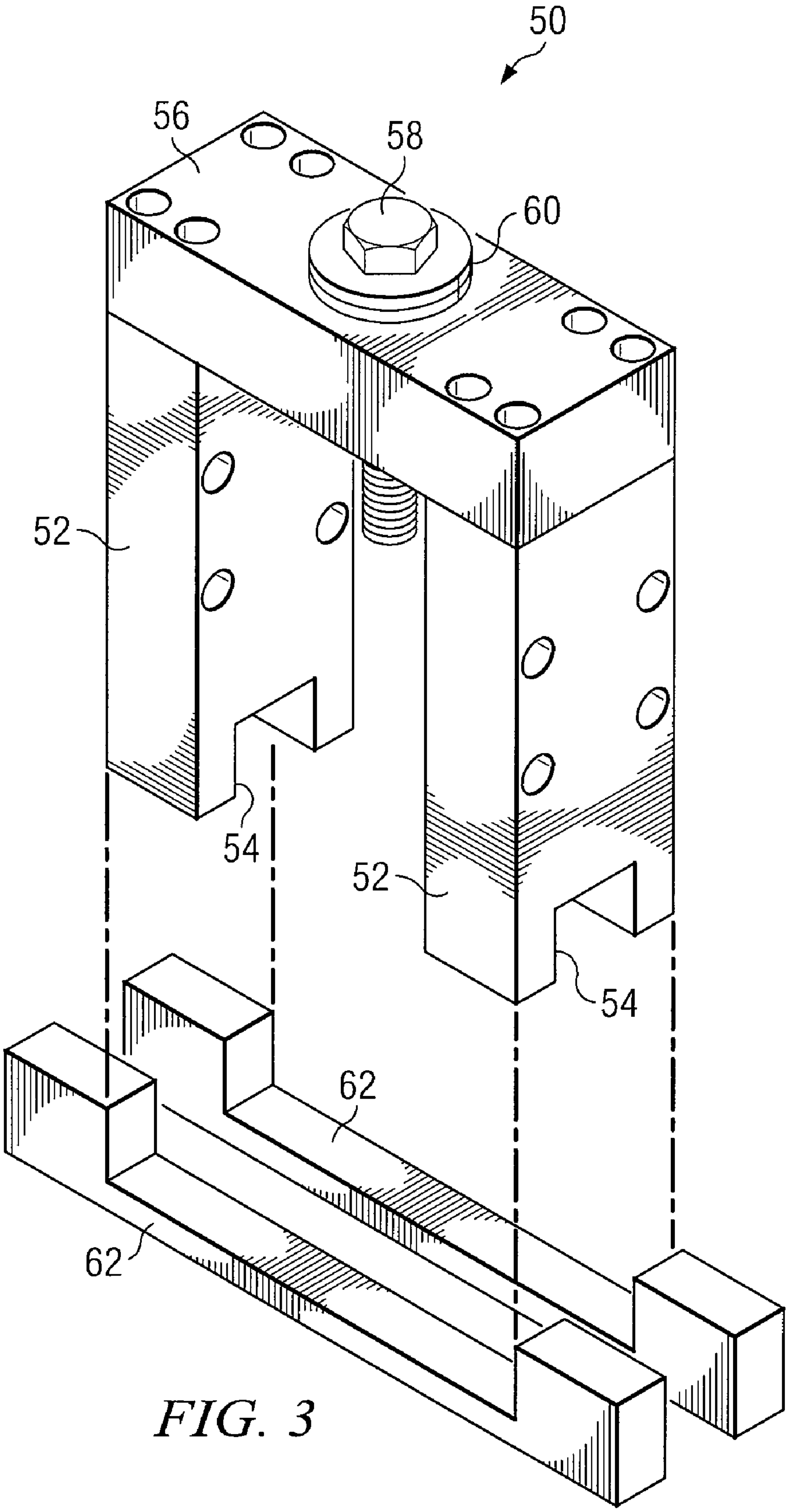
FIG. 3 illustrates one embodiment of a frame assembly that can be used in association with a removal tool to remove the connector pins.

Another technique for removing the connector pins 30 involves using a frame assembly to pull the removal tool 10 upward. One embodiment of a frame assembly is illustrated in FIG. 3. The frame assembly 50 includes two legs 52, connected to cap 56. The cap 56 can be connected to the legs by screws or any other suitable type of connector or method of connection, such as welding. Also, the cap 56 and legs 52 could comprise a single manufactured piece. The frame assembly 50 is used to pull the removal tool 10 and the clamped connector pins 30 away from the backplane 26 or other circuit board. This can be accomplished in a variety of ways. FIG. 3 shows one embodiment that includes a bolt 58 that is inserted through a threaded hole in cap 56. One or more washers like washers 60 can be used in conjunction with bolt 58. Bolt 58 is configured to thread into hole 14 in the attachment block 16 of removal tool 10. Specifically, frame assembly 50 is positioned over the removal tool 10 on the backplane 26 or other circuit board. As bolt 58 is threaded into hole 14, attachment block 16 is lifted away from the backplane 26, along with the rest of removal tool 10, and the connector pins 30 that have been clamped. Bolt 58 can be turned until the connector pins 30 are adequately free of the backplane 26, at which point the entire frame assembly 50 and removal tool 10 can be lifted from the backplane 26. The clamp plates 12 and pin plates 18 can then be loosened, for example by loosening tightening bolt 20, in order to remove the connector pins 30 from between the pin plates 18. The connector pins 30 can then be disposed of as needed. Once this has been accomplished, the removal tool 10 and frame assembly 50 can be readily set up and used to remove another plurality of connector pins 30.

Certain embodiments can also utilize skid plates 62 to prevent damage to the backplane 26. These skid plates 62 can be made of a material similar to what is used to make the frame assembly 50, or any other suitable material. The skid plates 62 are used so that the bottoms of the legs 52 of the frame assembly 50 do not rest directly on the backplane 26. If the surface area of the bottoms of the legs 52 of the frame assembly 50 is small, a relatively large amount of force (the force used to pull the connector pins 30 out of the backplane 26) is distributed over this small area, and this can cause damage to the backplane 26 or other circuit board. In one embodiment, the skid plates 62 have a surface area resting on the backplane 26 much larger than the bottoms of the legs 52 of the frame assembly 50, and thus the force is distributed over a greater area of the backplane 26, thus lessening any possible damage to the backplane 26.

Frame assembly 50 can also include cutouts 54 in the legs 52. These cutouts allow the frame assembly 50 to sit over the rows of connector pins, so that the bottoms of the legs 52 sit flat on the backplane 26, or flat on the skid plates 62.

Figure 4:
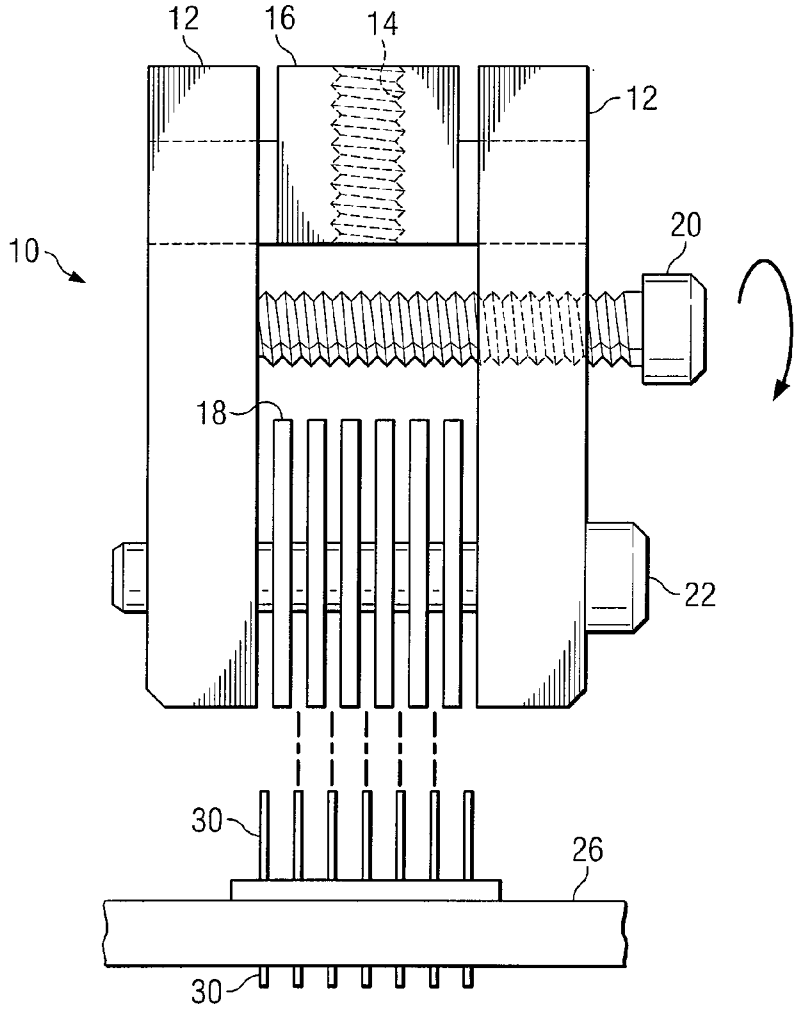
FIG. 4 illustrates an example positioning of a connector pin removal tool over connector pins for removal.

FIG. 4 illustrates an example positioning of a connector pin removal tool 10 over connector pins 30 for removal. Tightening bolt 20 is turned to loosen the clamp plates 12 and pin plates 18 so that pin plates 18 can be inserted over connector pins 30. Removal tool 10 is lowered onto the backplane 26 and connector pins 30 fit between the pin plates 18. Tightening bolt 20 is then turned, which tightens pin plates 18 around connector pins 30. Once tightened, the clamp assembly can be pulled away from the backplane 26, by use of a frame assembly 50 or any other suitable method. Connector pins 30 will also be pulled from the backplane 26. The tightening bolts can then be loosened so the connector pins 30 can be removed from between the pin plates 18 and discarded. The clamp assembly can then be placed over another set of connector pins 30 for their removal.

Figure 5:
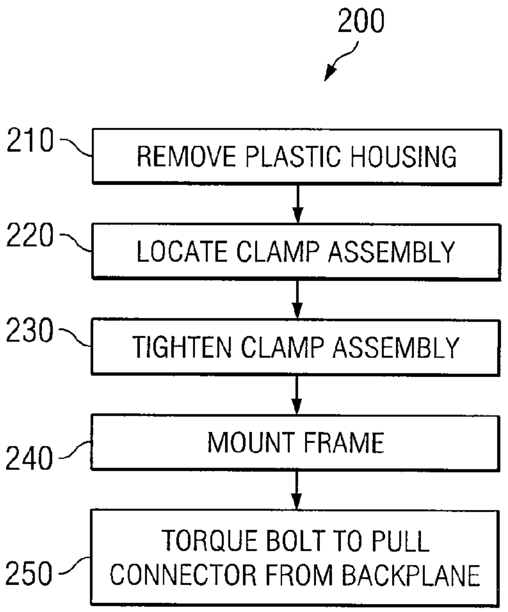
FIG. 5 is a flowchart illustrating an example method for removing connector pins.

FIG. 5 is a flowchart illustrating an example method 200 for removing connector pins. In some embodiments, it is necessary to remove the plastic housing that surrounds the connector pins. This is done in step 210. In step 220, the removal tool 10 is located over the connector pins to be removed. The removal tool 10 is positioned so that the connector pins 30 to be removed are located between the pin plates 18 and/or the clamp plates 12. All the connector pins 30 that are between the pin plates 18 and/or the clamp plates 12 will be removed once the removal tool 10 is tightened and lifted from the backplane 26. In step 230 the clamp assembly is tightened. This allows the pin plates to grasp the connector pins for removal. The removal tool 10 can be tightened in a variety of ways. For example, one method is to use one or more tightening bolts 20, as shown in FIG. 1, to tighten the clamp plates 12 and the pin plates 18. Other methods used to apply sufficient force to grasp the connector pins 30 are also within the scope of this disclosure. In step 240, the frame 50 is mounted over the removal tool 10. The frame 50 can sit on the backplane 26 in some embodiments, and can also comprise a bolt or a plurality of bolts 58 at the top used to lift the removal tool 10 and the connector pins 30 away from the backplane. In certain embodiments, the frame 50 can also use skid plates 62 to more evenly distribute the weight over the backplane 26, thus preventing damage to the backplane 26 when the connector pins 30 are removed. In step 250 the frame 50 is used to remove the connector pins 30 from the backplane. This can be accomplished by tightening the bolt or plurality of bolts 58 at the top of the frame 50, which will lift the removal tool 10 and the connector pins 30 off of the backplane. Other methods that use the frame assembly 50 to lift the removal tool 10 from the backplane 26 are also within the scope of this disclosure. Once the connector pins 30 are removed from the backplane 26, the removal tool 10 can be loosened so that the connector pins 30 can be disposed of and the removal tool 10 can be used again.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for removing connector pins from a circuit board, comprising:

at least two clamp plates;

a plurality of pin plates coupled between the clamp plates, the pin plates configured to be positioned between adjacent rows of the connector pins; and a tightening mechanism to tighten the clamp plates and the pin plates around the connector pins.

2. The system of claim 1, wherein the system further comprises a frame assembly configured to be positioned over the clamp plates, and configured to pull the clamp plates, the pin plates, and the connector pins off of the circuit board.

3. The system of claim 2, wherein the system further comprises an attachment block coupled between the clamp plates, and wherein the attachment block comprises a connector interface configured to receive a connector of the frame assembly, such that the attachment block may be pulled up from the circuit board by the frame assembly.

4. The system of claim 3, wherein the frame assembly comprises a plurality of legs coupled to a cap, wherein the one or more legs are configured to suspend the cap over the attachment block, and wherein the cap holds the connector of the frame assembly.

5. The system of claim 3, wherein the connector is a bolt, the connector interface is a threaded hole configured to receive the bolt, and wherein the bolt is configured to be inserted in the threaded hole such that an upward force on the frame assembly lifts the clamp plates and the pin plates away from the circuit board.

6. The system of claim 2, wherein the frame assembly further comprises skid plates configured to be positioned between the frame assembly and the circuit board to distribute the weight of the frame assembly on the circuit board.

7. The system of claim 1, wherein the tightening mechanism comprises one or more bolts, and wherein the one or more bolts are threaded through one clamp plate and exert clamping force when tightened against another clamp plate.

8. The system of claim 1, wherein the pin plates comprise one or more grooves configured to grip the connector pins.

9. The system of claim 1, wherein the plurality of pin plates comprises a substantially parallel arrangement of plates.

10. A system for removing connector pins from a circuit board, comprising:

at least two clamp plates;

a plurality of pin plates coupled between the clamp plates, the pin plates configured to be positioned between adjacent rows of the connector pins;

a tightening mechanism to tighten the clamp plates and the pin plates around the connector pins, wherein the tightening mechanism comprises one or more bolts, and wherein the one or more bolts are threaded through one clamp plate and exert clamping force when tightened against another clamp plate;

a frame assembly configured to be positioned over the clamp plates, and configured to pull the clamp plates, the pin plates, and the connector pins off of the circuit board; and an attachment block coupled between the clamp plates, wherein the attachment block comprises a connector interface configured to receive a connector of the frame assembly, such that the attachment block may be pulled up from the circuit board by the frame assembly.

* * * * *